(12) United States Patent
Kotera

(10) Patent No.: US 9,818,426 B2
(45) Date of Patent: Nov. 14, 2017

(54) ECHO CANCELLER

(71) Applicant: MITSUBISHI ELECTRIC CORPORATION, Tokyo (JP)

(72) Inventor: Hironori Kotera, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/502,149

(22) PCT Filed: Aug. 13, 2014

(86) PCT No.: PCT/JP2014/071368
§ 371 (c)(1),
(2) Date: Feb. 6, 2017

(87) PCT Pub. No.: WO2016/024345
PCT Pub. Date: Feb. 18, 2016

(65) Prior Publication Data
US 2017/0229138 A1    Aug. 10, 2017

(51) Int. Cl.
*H04B 3/20* (2006.01)
*H04R 3/00* (2006.01)
*G10L 21/0232* (2013.01)
*H04R 3/12* (2006.01)
(Continued)

(52) U.S. Cl.
CPC ...... *G10L 21/0232* (2013.01); *G10L 21/0272* (2013.01); *H04M 1/6075* (2013.01);
(Continued)

(58) Field of Classification Search
CPC ... H04B 3/20; H04B 3/23; H04R 3/00; H04R 3/02; H04R 3/04; H04R 3/005;
(Continued)

(56) References Cited

U.S. PATENT DOCUMENTS 6,665,645 B1    12/2003    Ibaraki et al.
2007/0258579 A1*    11/2007    Hirai ..................... H04M 9/082
379/406.08
(Continued)

FOREIGN PATENT DOCUMENTS

JP    61-72420 A    4/1986
JP    2-244099 A    9/1990
(Continued)

*Primary Examiner* — Thang Tran
(74) *Attorney, Agent, or Firm* — Birch, Stewart, Kolasch & Birch, LLP

(57) ABSTRACT

Disclosed is an echo canceller 10 including: mixers 11A and 11B each to mix output signals outputted by speakers 7FL and 7FR with an instructed mixing ratio, and to generate reference signals for microphones 8A and 8B; an adaptive filter 12 to generate two pseudo echo signals from the two reference signals generated by the mixers 11A and 11B; subtractors 13A and 13B to subtract the two pseudo echo signals from input signals from the microphones 8A and 8B, and to generate two echo eliminated signals; residual echo detectors 14A and 14B to detect residual amounts of echo remaining in the echo eliminated signals obtained from the microphones 8A and 8B; and a mixing ratio changer 15 to instruct a change of the mixing ratios of the mixers 11A and 11B in accordance with the residual amounts of echo.

5 Claims, 8 Drawing Sheets

(51) Int. Cl.
*G10L 21/0272* (2013.01)
*H04R 3/04* (2006.01)
*H04M 9/08* (2006.01)
*H04M 1/60* (2006.01)
*G10L 21/0208* (2013.01)
*G10L 21/0216* (2013.01)

(52) U.S. Cl.
CPC ............ *H04M 9/082* (2013.01); *H04R 3/005* (2013.01); *H04R 3/04* (2013.01); *H04R 3/12* (2013.01); *G10L 2021/02082* (2013.01); *G10L 2021/02166* (2013.01)

(58) Field of Classification Search
CPC .... H04R 3/12; H04R 1/1083; H04R 2499/13; G10K 2210/3226; G10K 11/178; G10K 2210/505; G10L 2021/02166; G10L 2021/02082; G10L 21/02; G10L 21/0208; G10L 21/0216; G10L 21/0232; G10L 21/0272; H04M 1/6075; H04M 9/082
See application file for complete search history.

(56) References Cited

U.S. PATENT DOCUMENTS

| | | | |
|---|---|---|---|
| 2008/0031466 A1* | 2/2008 | Buck | H04M 9/082 381/66 |
| 2009/0316923 A1* | 12/2009 | Tashev | H04M 9/082 381/66 |
| 2011/0213553 A1 | 9/2011 | Taniguchi et al. | |
| 2012/0163580 A1 | 6/2012 | Fujita et al. | |

FOREIGN PATENT DOCUMENTS

| | | |
|---|---|---|
| JP | 2001-100785 A | 4/2001 |
| JP | 2006-314051 A | 11/2006 |
| JP | 2008-311848 A | 12/2008 |
| JP | 2009-17331 A | 1/2009 |
| JP | 2009-216835 A | 9/2009 |
| JP | WO 2010/070781 A1 | 6/2010 |
| JP | 2012-134923 A | 7/2012 |

* cited by examiner

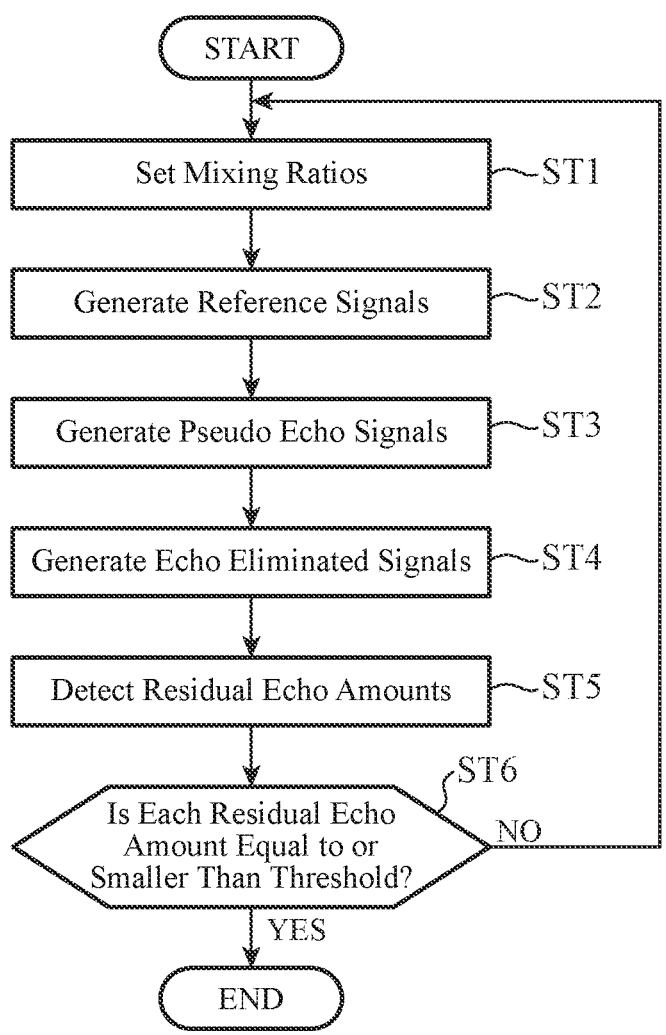

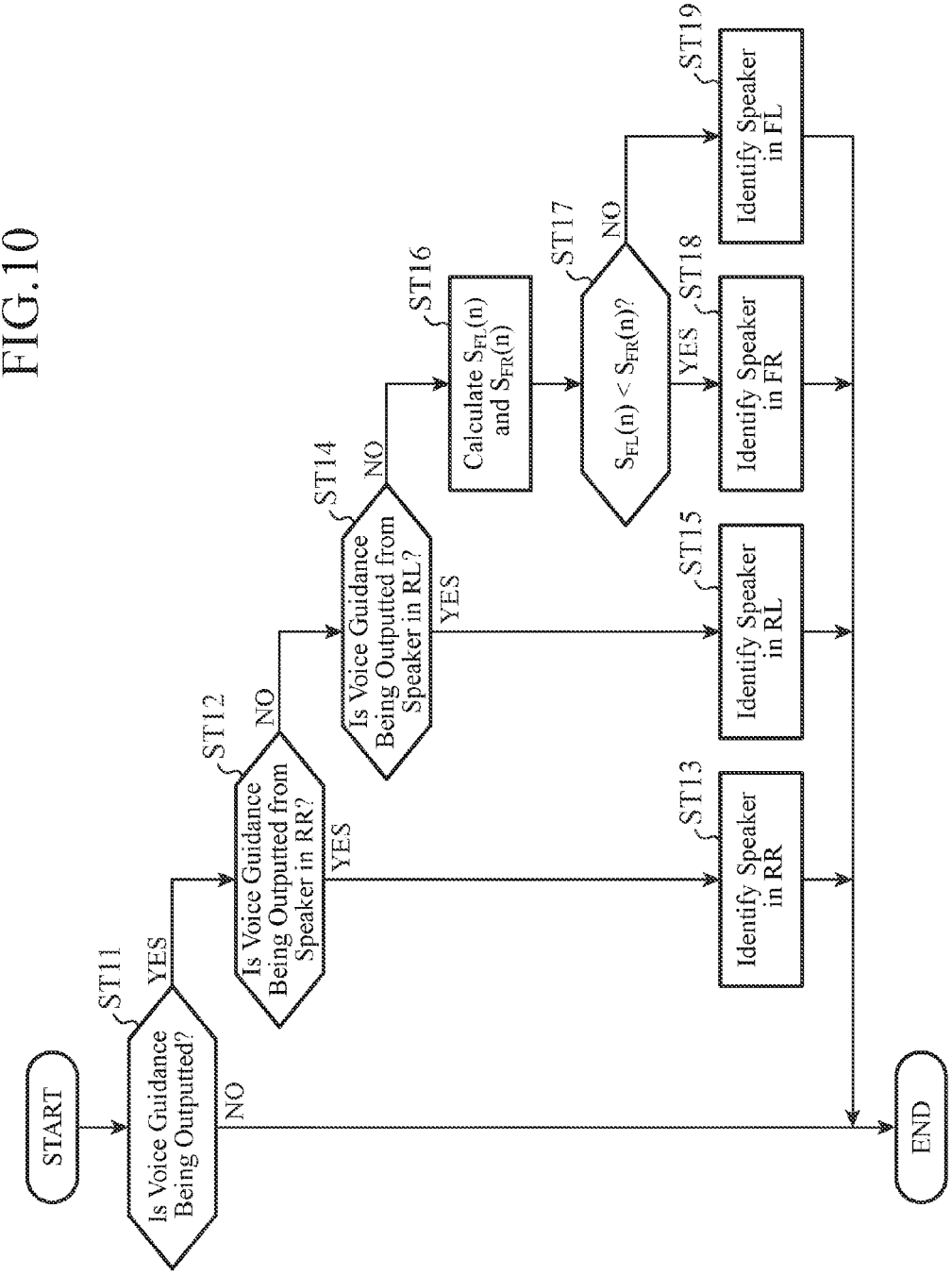

ECHO CANCELLER

TECHNICAL FIELD

The present invention relates to an echo canceller for use in a system equipped with a plurality of speakers and microphones.

BACKGROUND ART

Hands-free call systems for vehicle use an echo canceller to remove echoes caused by portion of a sound outputted from a speaker returning back into a microphone. The echo canceller acquires a voice signal to be outputted by the speaker as a reference signal, and removes the echo included in the signal inputted from the microphone (for example, refer to Patent Literature 1).

Based on an assumption that the outputs from a front left (FL) speaker mounted at a front left side area in a vehicle and a front right (FR) speaker mounted at a front right side area in the vehicle are symmetric, conventional echo cancellers acquire a reference signal from one of the FL and FR speakers. If the outputs from the FL and FR speakers are symmetric as assumed above, amounts of echo entering the FL and FR microphones, which are disposed left and right in the vehicle respectively, are equal. Therefore, echoes can be subtracted from input signals using an identical reference signal for both the FL and FR microphones. However, in a situation in which the outputs from the FL and FR speakers are asymmetric, for example, a voice guidance provided by a car navigation device is outputted only from a speaker on a driver side, the echo cannot be removed completely because amounts of echo entering into the microphones differ. Therefore, private information included in the voice guidance, such as currently traveling position, may be transmitted to a mobile phone at a far end.

To solve this problem, Patent Literature 2 proposes an echo canceller that mixes a sound signal to be outputted from an FL speaker and a sound signal to be outputted from an FR speaker to generate a reference signal, thereby adjusting the unbalance between the amount of echo entering an FL microphone and that entering an FR microphone.

CITATION LIST

Patent Literature

Patent Literature 1: Japanese Unexamined Patent Application Publication No. 2009-216835
Patent Literature 2: Japanese Unexamined Patent Application Publication No. Hei 2-244099

SUMMARY OF INVENTION

Technical Problem

A problem with the echo canceller disclosed in above-mentioned Patent Literature 2 is that because the mixing ratio of the sound signals outputted from the FL and FR speakers is preset to a fixed value, the echo cannot be removed completely under a situation in which the power ratio between the FL and FR speakers changes dynamically.

The present invention is made in order to solve the above-mentioned problem, and it is therefore an object of the present invention to remove an echo with a high degree of accuracy even in a situation in which the power ratio of a plurality of speakers changes dynamically.

Solution to Problem

According to the present invention, there is provided an echo canceller for removing echoes from N (N≥2) input signals inputted through N microphones that receive a plurality of output signals outputted by a plurality of speakers, wherein a superimposition signal is superimposed temporarily onto at least one of the plurality of output signals, the echo canceller comprising: N mixers to generate N reference signals, each mixer to mix the plurality of output signals outputted by the plurality of speakers with a mixing ratio instructed to use; an adaptive filter to generate N pseudo echo signals from the N reference signals generated by the N mixers; N subtractors to subtract the N pseudo echo signals from the N input signals, and to generate N echo eliminated signals; and a mixing ratio changer to instruct the N mixers to change the mixing ratio on a basis of an amount of echo contained in each of the N input signals.

Advantageous Effects of Invention

Because the echo canceller according to the present invention changes the mixing ratios used by the N mixers on the basis of the amounts of echo contained in the N input signals, the echo canceller can remove echoes accurately even in a situation in which the power ratio of the plurality of speakers changes dynamically.

BRIEF DESCRIPTION OF DRAWINGS

FIG. 7 is a flow chart showing a process of dynamically changing the mixing ratio in the echo canceller according to Embodiment 1;
FIG. 10 is a flow chart showing a speaker identification process performed by the echo canceller according to Embodiment 2.

DESCRIPTION OF EMBODIMENTS

Hereafter, in order to explain this invention in greater detail, preferred embodiments of the present invention will be described with reference to the accompanying drawings.

Embodiment 1

Figure 1:
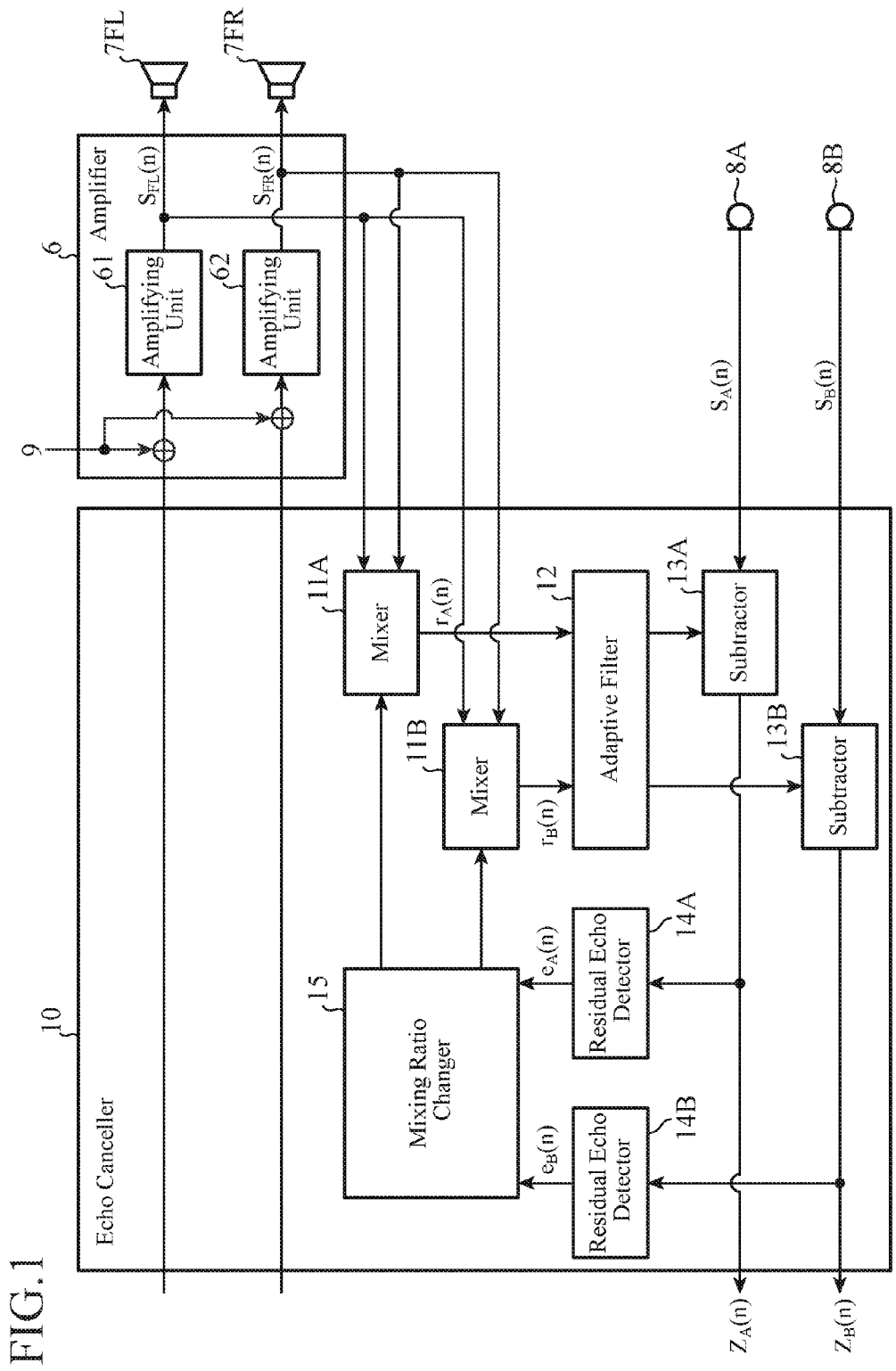
FIG. 1 is a block diagram showing an example of the configuration of an echo canceller according to Embodiment 1 of the present invention.
Figure 2:
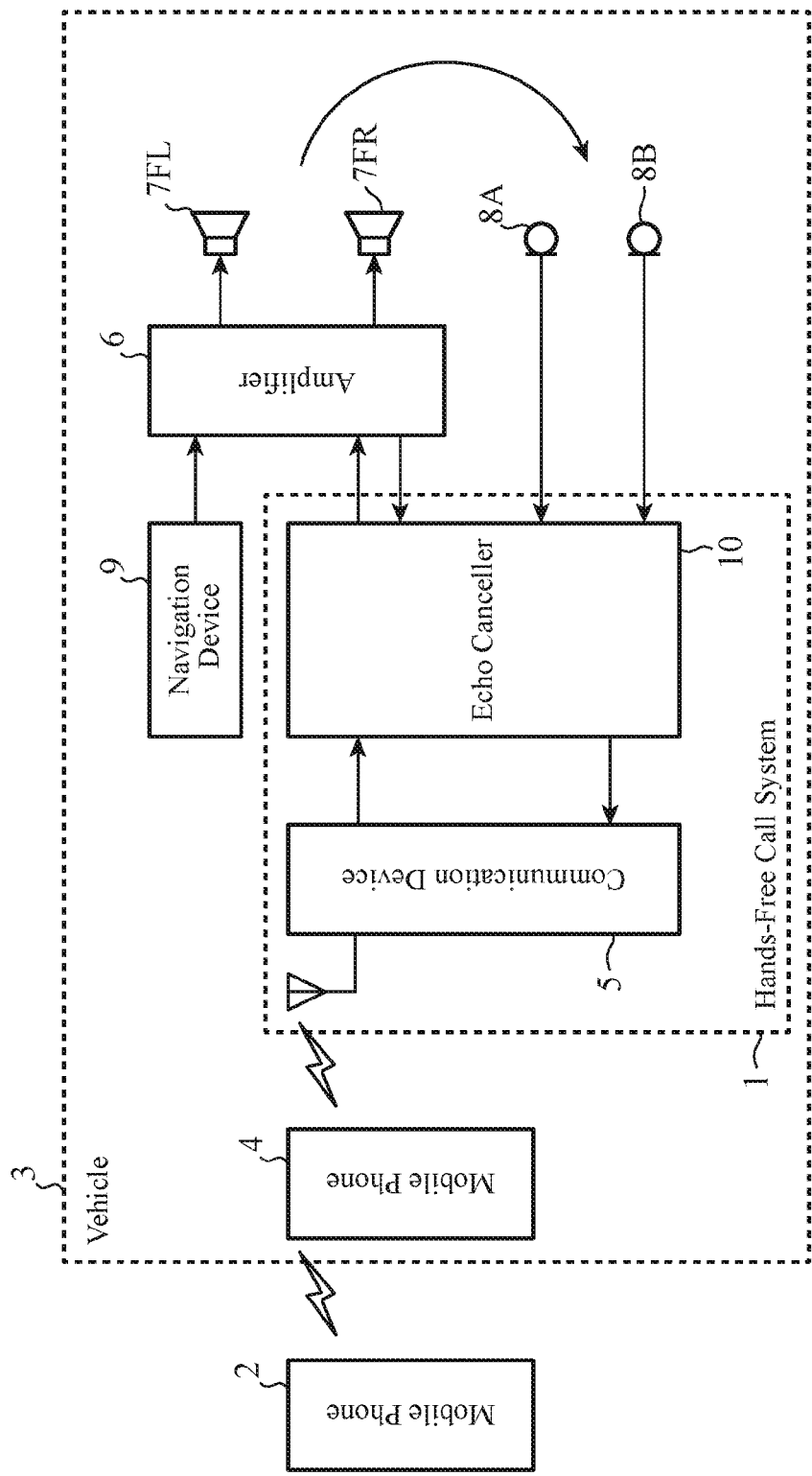
FIG. 2 is a block diagram showing an example of the configuration in the case of applying the echo canceller according to Embodiment 1 to a vehicle-mounted hands-free call system.

FIG. 1 is a block diagram showing an example of the configuration of an echo canceller 10 according to Embodiment 1. FIG. 2 is a block diagram showing an example of the configuration in the case of applying the echo canceller 10 according to Embodiment 1 to a vehicle-mounted hands-free call system 1. Hereafter, the echo canceller 10 will be explained in accordance with the hands-free call system 1.

As shown in FIG. 2, the hands-free call system 1 includes a communication device 5 and the echo canceller 10. An opposite party's voice signal is transmitted from a mobile phone 2 at a far end to a mobile phone 4, and further transmitted from the mobile phone 4 to a communication device 5 via short-range wireless communications or the like. The opposite party's voice is then sent from the communication device 5 to an amplifier 6 mounted in a vehicle 3 via the echo canceller 10, and amplified by the amplifier 6. Amplified signals are outputted from voice from speakers 7FL and 7FR. Further, in Embodiment 1, voice signals such as voice guidance by a navigation device 9 mounted in the vehicle 3 or the like are also amplified by the amplifier 6 and outputted from the speakers 7FL and 7FR by voice.

Utterances of a passenger in the vehicle 3 are inputted through microphones 8A and 8B. Echoes due to, for example, the opposite party's voice and/or the voice guidance are removed by the echo canceller 10 from the signals inputted through the microphones 8A and 8B. Output signals from the echo canceller 10 are transmitted from the communication device 5 to the mobile phone 4 via short-range wireless communications or the like, and transmitted from the mobile phone 4 to the mobile phone 2 at the far end.

Figure 3:
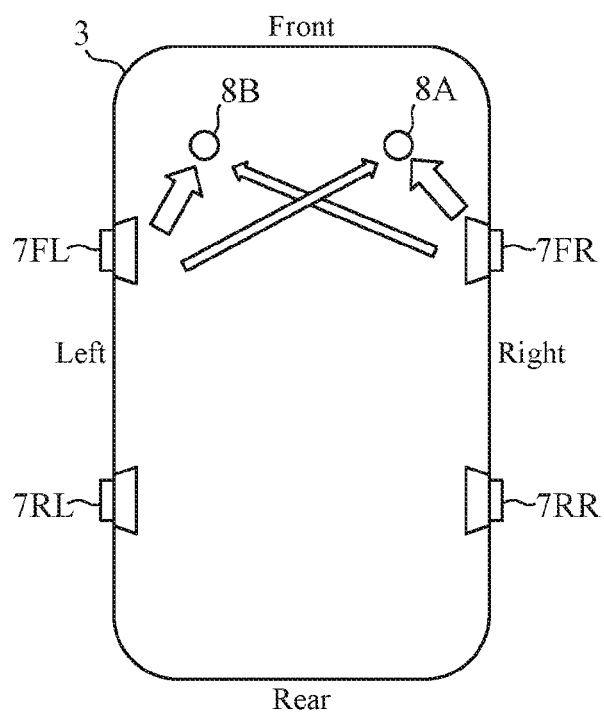
FIG. 3 is a diagram showing an example of the installation of speakers and microphones of the handsfree call system in a vehicle, and shows a case in which the outputs of the two speakers disposed in a front portion of the vehicle are symmetric.

An example of the installation of the speakers 7FL, 7FR and the microphones 8A, 8B in the vehicle is shown in FIG. 3. The speaker 7FL is mounted in a front left side portion of the vehicle 3, while the speaker 7FR is mounted in a front right side portion of the vehicle. A speaker 7RL is mounted in a rear left side portion of the vehicle, while a speaker 7RR is mounted in a rear right side portion of the vehicle. Note that the speakers 7RL and 7RR are not used in Embodiment 1.

Further, the microphone 8A is mounted in a front right portion of the vehicle 3, and the microphone 8B is mounted in a front left portion of the vehicle.

Next, details of the echo canceller 10 will be explained.

The echo canceller 10 can be fabricated using a general-purpose processor or a digital signal processor (DSP) suitable for digital signal processing, or can be fabricated using both a general-purpose processor and DSP in combination.

A reception voice received by the hands-free call system 1 and a voice guidance temporarily outputted by the navigation device 9 are amplified by amplifying units 61 and 62 of the amplifier 6, and outputted from the speakers 7FL and 7FR. A voice signal outputted from the speaker 7FL at a time n is expressed by an output signal $S_{FL}(n)$, and a voice signal outputted from the speaker 7FR at the time n is expressed by an output signal $S_{FR}(n)$. A voice uttered by a passenger in the vehicle 3 is inputted to the microphones 8A and 8B in a state in which sounds outputted from the speakers 7FL and 7FR are mixed into the voice. A voice signal inputted to the microphone 8A is expressed by an input signal $S_A(n)$, and a voice signal inputted to the microphone 8B is expressed by an input signal $S_B(n)$.

A mixer 11A mixes the output signals $S_{FL}(n)$ and $S_{FR}(n)$ acquired from the amplifier 6 with a mixing ratio which is instructed to use by a mixing ratio changer 15, and generates a reference signal $r_A(n)$ for the microphone 8A. Similarly, a mixer 11B mixes the output signals $S_{FL}(n)$ and $S_{FR}(n)$ acquired from the amplifier 6 with a mixing ratio which is instructed to use by the mixing ratio changer 15, and generates a reference signal $r_B(n)$ for the microphone 8B.

An adaptive filter 12 generates a pseudo echo signal from the reference signal $r_A(n)$ generated by the mixer 11A using a gain common to the microphones 8A and 8B. Similarly, the adaptive filter 12 generates a pseudo echo signal from the reference signal $r_B(n)$ generated by the mixer 11B using a gain common to the microphones 8A and 8B.

Because known techniques can be used for an adaptive filter process performed by the adaptive filter 12, a detailed explanation of the adaptive filter process will be omitted. Further, residual echo amounts detected by residual echo detectors 14A and 14B may be used for updating the adaptive filter.

A subtractor 13A subtracts the pseudo echo signal generated based on the reference signal $r_A(n)$ from the input signal $S_A(n)$ inputted via the microphone 8A, and generates an echo eliminated signal $Z_A(n)$. Similarly, a subtractor 13B subtracts the pseudo echo signal generated based on the reference signal $r_B(n)$ from the input signal $S_B(n)$ inputted via the microphone 8B, and generates an echo eliminated signal $Z_B(n)$.

A residual echo detector 14A detects an amount of residual echo $e_A(n)$ from the echo eliminated signal $Z_A(n)$ outputted from the subtractor 13A. Similarly, a residual echo detector 14B detects an amount of residual echo $e_B(n)$ from the echo eliminated signal $Z_B(n)$ outputted from the subtractor 13B.

Because known techniques can be used for the process of detecting the amount of residual echo which is performed by each of the residual echo detectors 14A and 14B, a detailed explanation of the detecting process will be omitted. For example, a method of outputting a test signal from the echo canceller 10 to the speakers 7FL and 7FR, and detecting residual amounts of the test signal by the residual echo detectors 14A and 14B can be used.

The mixing ratio changer 15 instructs the mixers 11A and 11B to use a mixing ratio in such a way that the amount of residual echo $e_A(n)$ detected by the residual echo detector 14A and the amount of residual echo $e_B(n)$ detected by the residual echo detector 14B become equal to or smaller than a threshold. This threshold may take any value, including 0.

As shown in FIG. 3, when the sound outputs of the speakers 7FL and 7FR are symmetric, the amounts of echo inputted to the microphones 8A and 8B are substantially equal. Therefore, it doesn't matter that the reference signals $r_A(n)$ and $r_B(n)$ for the microphones 8A and 8B are the same. More specifically, the mixer 11A mixes the output signals $S_{FL}(n)$ and $S_{FR}(n)$ with the ratio of the output signals $S_{FL}(n)$ and $S_{FR}(n)=1:1$, to generate the reference signal $r_A(n)$ for the microphone 8A, and the mixer 11B similarly mixes the output signals $S_{FL}(n)$ and $S_{FR}(n)$ with the ratio of the output signals $S_{FL}(n)$ and $S_{FR}(n)=1:1$, to generate the reference signal $r_B(n)$ for the microphone 8B. By this, echoes can be removed optimally from the input signals $S_A(n)$ and $S_B(n)$ of the microphones 8A and 8B.

Figure 4:
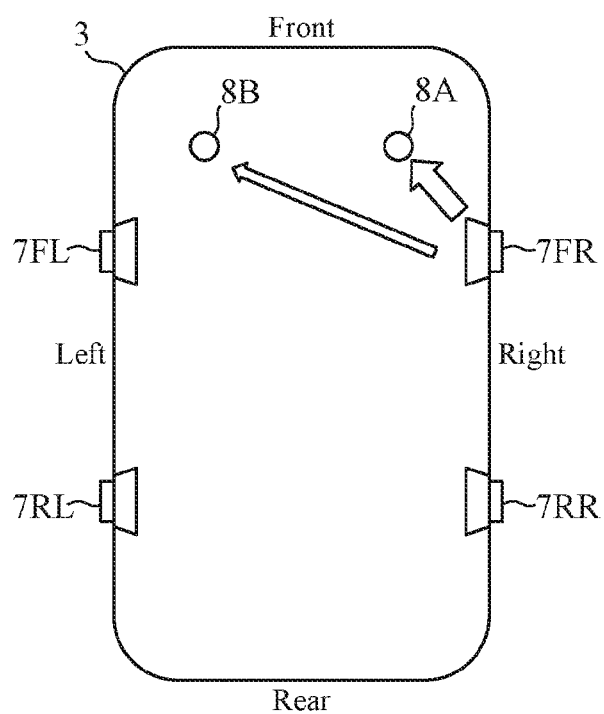
FIG. 4 is a diagram showing an example of the installation of the speakers and the microphones of the handsfree call system in the vehicle, and shows a case in which the outputs of the two speakers disposed in the front portion of the vehicle are asymmetric.

On the other hand, echo remains if a sound is outputted only from the speaker 7FR as shown in FIG. 4, and if the reference signals $r_A(n)$ and $r_B(n)$ are same, because the amount of echo inputted to the microphone 8B is smaller than the amount of echo inputted to the microphone 8A.

Figure 5A:
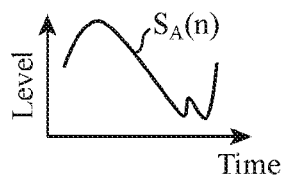
FIGS. 5A to 5F each shows a graph illustrating a signal wave form in distinct units of the echo canceller in a case in which the outputs of the speakers are asymmetric and a mixing ratio for each microphone is equal.
Figure 5B:
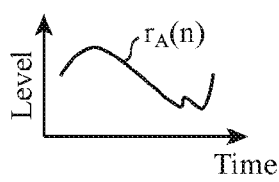
Figure 5C:
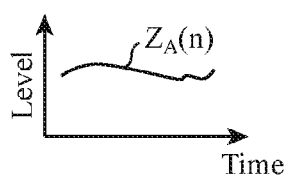
Figure 5D:
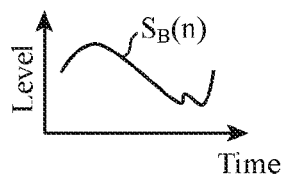
Figure 5E:
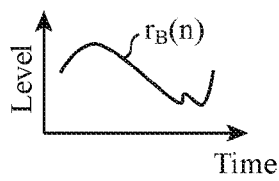
Figure 5F:
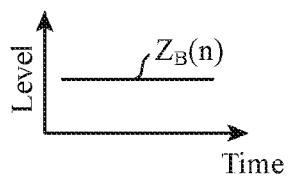

The input signal $S_A(n)$ of the microphone 8A is shown in FIG. 5A, and the input signal $S_B(n)$ of the microphone 8B is shown in FIG. 5D. When the reference signals $r_A(n)$ and $r_B(n)$ having the same waveform as shown in FIGS. 5B and 5E are used for these input signals $S_A(n)$ and $S_B(n)$, the echo remains in the echo eliminated signal $Z_A(n)$, as shown in FIG. 5C. In contrast, as shown in FIG. 5F, the echo is removed optimally from the echo eliminated signal $Z_B(n)$ of the microphone 8B.

For example, in the situation in which the reception voice of the hands-free call system 1 is being outputted symmetrically from the speakers 7FL and 7FR, if a voice guidance from the navigation device 9 is superimposed only onto the reception voice from the speaker 7FR on a driver side, the echo of the voice guidance remains in the echo eliminated signal $Z_A(n)$ of the microphone 8A, which is near to the speaker 7FR. Therefore, private information, such as current location of the vehicle 3, is transmitted to the mobile phone 2 at a far end.

In such a case, the mixing ratio of the output signals $S_{FL}(n)$ and $S_{FR}(n)$ when generating reference signals is changed between the microphone 8A and the microphone 8B.

Figure 6A:
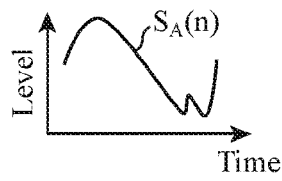
FIGS. 6A to 6F each shows a graph illustrating a signal wave form in distinct units of the echo canceller in a case in which the outputs of the speakers are asymmetric and the mixing ratio for each microphone differs.
Figure 6B:
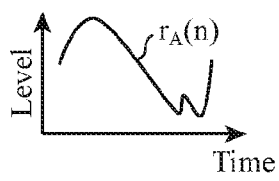
Figure 6C:
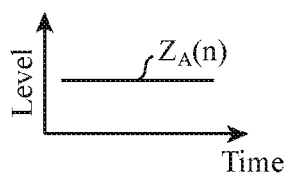

Because a large amount of echo from the speaker 7FR is mixed into the input signal $S_A(n)$ of the microphone 8A, as shown in FIG. 6A, the mixer 11A mixes the output signals $S_{FL}(n)$ and $S_{FR}(n)$ with the ratio of the output signals $S_{FL}(n)$ and $S_{FR}(n)$=3:7, to generate the reference signal $r_A(n)$ (FIG. 6B). As a result, the echo eliminated signal $Z_A(n)$ in which the echo is removed optimally is acquired as shown in FIG. 6C.

Figure 6D:
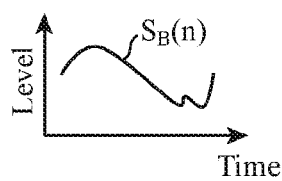
Figure 6E:
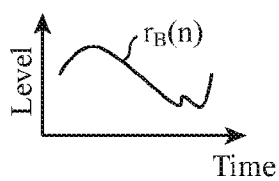
Figure 6F:
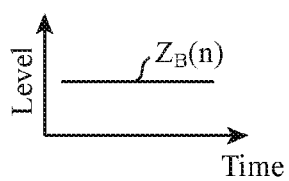

In contrast, because a small amount of echo from the speaker 7FR is mixed into the input signal $S_B(n)$ of the microphone 8B, as shown in FIG. 6D, the mixer 11B mixes the output signals $S_{FL}(n)$ and $S_{FR}(n)$ with the ratio of the output signals $S_{FL}(n)$ and $S_{FR}(n)$=7:3, to generate the reference signal $r_B(n)$ (FIG. 6E). As a result, the echo eliminated signal $Z_B(n)$ in which the echo is removed optimally is acquired as shown in FIG. 6F.

Note that as to the implementation of updating the adaptive filter 12 and of updating the mixing ratios of the mixers 11A and 11B implemented by the echo canceller 10 according to the present invention, it is preferable that the mixing ratios are updated first and then the adaptive filter 12 is updated.

Next, processing of dynamically changing the mixing ratios will be explained with reference to a flow chart illustrated in FIG. 7. The echo canceller 10 performs the processing shown in the flow chart of FIG. 7 periodically.

First, the mixing ratio changer 15 instructs each of the mixers 11A and 11B to use a mixing ratio, and the mixers 11A and 11B each set the instructed mixing ratio thereto (in step ST1). The mixers 11A and 11B each mix the output signals $S_{FL}(n)$ and $S_{FR}(n)$ using the set mixing ratio to generate a reference signals $r_A(n)$ or $r_B(n)$ (in step ST2).

At the time of starting the echo canceller 10 (i.e., at the time of performing the process shown in the flow chart of FIG. 7 for the first time), the initial value of the mixing ratio is set to, for example, the output signals $S_{FL}(n)$ and $S_{FR}(n)$=1:1. After the echo canceller 10 is started (i.e., at the time of performing the process shown in the flow chart of FIG. 7 for the second or subsequent time), a mixing ratio set at the time of previously performing the processing shown in the flowchart is used as their initial value.

The adaptive filter 12 generates a pseudo echo signal from the reference signal $r_A(n)$ for the microphone 8A, and also generates a pseudo echo signal from the reference signal $r_B(n)$ for the microphone 8B (in step ST3). The subtractor 13A subtracts the pseudo echo signal generated based on the reference signal $r_A(n)$ from the input signal $S_A(n)$ of the microphone 8A, to generate an echo eliminated signal $Z_A(n)$ (in step ST4). In parallel with this process, the subtractor 13B subtracts the pseudo echo signal generated based on the reference signal $r_B(n)$ from the input signal $S_B(n)$ of the microphone 8B, to generate an echo eliminated signal $Z_B(n)$ (in step ST4).

The residual echo detector 14A detects an amount of residual echo $e_A(n)$ remaining in the echo eliminated signal $Z_A(n)$ from the microphone 8A (in step ST5). In parallel with this process, the residual echo detector 14B detects an amount of residual echo $e_B(n)$ remaining in the echo eliminated signal $Z_B(n)$ from the microphone 8B (in step ST5).

The mixing ratio changer 15 determines whether or not each of the amounts of residual echo, $e_A(n)$ and $e_B(n)$, is equal to or smaller than a threshold (in step ST6). If both the residual echo amounts equal to or smaller than the threshold ("YES" in step ST6), the processing of changing the mixing ratio ends. In contrast, if at least one of the amounts residual echo is larger than the threshold ("NO" in step ST6), the process returns to step ST1 and the mixing ratio changer 15 instructs the mixers 11A and 11B to use a mixing ratio different from the last one, which was instructed to use in previous step ST1.

For example, when the outputs of the speakers 7FL and 7FR are symmetric, the echo inputted into each of the microphones 8A and 8B can be removed optimally by using the initial value of mixing ratio, 1:1. Accordingly, the amounts of residual echo $e_A(n)$ and eB(n) are equal to or smaller than the threshold ("YES" in step ST6), and thus the echo canceller 10 ends the processing for changing the mixing ratios. In contrast, when the outputs of the speakers 7FL and 7FR are asymmetric and at least one of the amounts of residual echo $e_A(n)$ and $e_B(n)$ is larger than the threshold (when "NO" in step ST6), the process returns to step ST1. The mixing ratio changer 15 changes the mixing ratio(s) and instructs the mixer 11A and/or the mixer 11B to use a new mixing ratio.

For example, when the amount of residual echo from the microphone 8A is larger than that from the microphone 8B, the mixing ratio changer 15 changes the ratio of the output signals $S_{FL}(n)$ and $S_{FR}(n)$ to 4:6 in such a way that the percentage of the output signal $S_{FR}(n)$ of the speaker 7FR mounted in the vicinity of the microphone 8A becomes large (step ST1). When each of the amounts of residual echo is equal to or smaller than the threshold in step ST6 after changing the mixing ratio ("YES" in step ST6), the mixing ratio changer 15 determines that the mixing ratio of 4:6 is optimal, and ends the changing processing. In contrast, when the amount of residual echo from the microphone 8A is larger than the threshold and the amount of residual echo from the microphone 8A is larger than that from the microphone 8B in step ST6 after changing the mixing ratio ("NO" in step ST6), the process is returned to step ST1 and the mixing ratio changer 15 changes the mixing ratio to 3:7. The mixing ratio changer repeats the processes of steps ST1 to ST6 in this way until the mixing ratio(s) reaches a value which enables optimally removing the echo out of the input signals $S_A(n)$ and $S_B(n)$ from the microphones 8A and 8B.

As described above, the echo canceller 10 according to Embodiment 1 is configured to include: the mixers 11A and 11B each to mix a plurality of output signals outputted by a plurality of speakers with a mixing ratio that is instructed to use, and to generate two reference signals whose number is the same as the number of microphones; the adaptive filter 12 to generate two pseudo echo signals from the two reference signals generated by the mixers 11A and 11B; the subtractors 13A and 13B to subtract the two pseudo echo signals from two input signals, and to generate two echo eliminated signals; and the mixing ratio changer 15 to instruct a change of the mixing ratios of the mixers 11A and 11B on the basis of the amounts of echoes contained into the two input signals. Therefore, in a situation in which the power ratio between the plurality of speakers changes dynamically because a superimposition signal is superimposed temporally onto at least one of the plurality of output signals outputted by the plurality of speakers, the echo canceller can remove echoes accurately.

Further, the echo canceller 10 according to Embodiment 1 includes two residual echo detectors 14A and 14B to detect amounts of residual echo from the two echo eliminated signals whose number is the same as the number of microphones, and the mixing ratio changer 15 is configured so as to repeat the processing for changing the mixing ratio of the mixers 11A and 11B until each of the two amounts of residual echo detected by the residual echo detectors 14A and 14B becomes smaller than or equal to the threshold. Therefore, the echo canceller can change the mixing ratios to values corresponding to amounts of echo contained in the input signals, and improves its echo removal performance.

Although the case of using the two microphones 8A and 8B is shown as an example in the above-mentioned explanation, the number of microphones may be three or more. When the number of microphones is N (N≥2), the number of mixers is also N, the number of subtractors is also N, and the number of residual echo detectors is also N. Further, although the case in which the two speakers 7FL and 7FR are used is shown as an example, the number of speakers may be three or more.

Further, although in the above-mentioned explanation, the example in which a voice guidance outputted from the navigation device 9 is superimposed onto the reception voice received by the hands-free call system 1 is shown as an example of a signal outputted from a speaker, this embodiment is not limited to this example, and a warning sound produced while the vehicle 3 is traveling backward or the like may be superimposed onto the reception voice.

Embodiment 2

The echo canceller 10 according to above-described Embodiment 1 does not know from which speaker a voice guidance provided by the navigation device 9 is outputted. Therefore, the echo canceller repeats the process of changing the mixing ratios until the mixing ratios reach optimal values which make it possible to remove the echo from each of the input signals of the microphones 8A and 8B. Because this method may require a bit long time to find out optimal mixing ratios, there is a possibility that echoes cannot be completely removed immediately after a voice guidance is output. To solve this problem, an echo canceller 10 according to this Embodiment 2 is configured so as to identify a speaker outputting a voice guidance of a navigation device 9, and change the mixing ratios to values according to a result of this identification.

Figure 8:
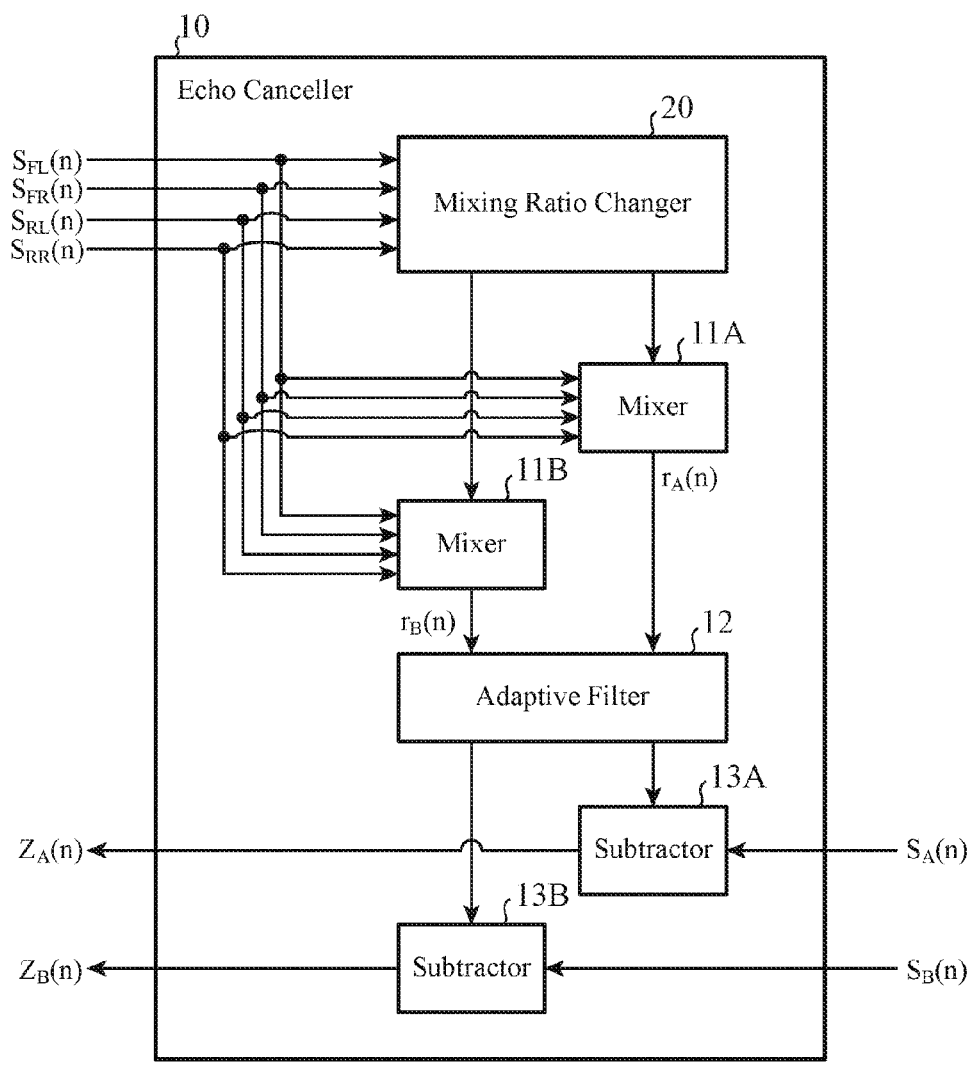
FIG. 8 is a block diagram showing an example of the configuration of an echo canceller according to Embodiment 2 of the present invention.

FIG. 8 is a block diagram showing the configuration of the echo canceller 10 according to Embodiment 2. Because an example of the configuration in the case of applying this echo canceller 10 to a vehicle-mounted hands-free call system 1 is the same as that shown in FIG. 2 from a graphical viewpoint, an explanation of the example will be made using FIG. 2. Further, in Embodiment 2, a case in which four speakers 7FL, 7FR, 7RL and 7RR are mounted in a vehicle 3 will be shown as an example. An example of arrangement of the four speakers 7FL, 7FR, 7RL and 7RR in the vehicle is shown in FIG. 3. A voice signal outputted from the speaker 7FL at a time n is expressed by an output signal $S_{FL}(n)$, a voice signal outputted from the speaker 7FR at the time n is expressed by an output signal $S_{FR}(n)$, a voice signal outputted from the speaker 7RL at the time n is expressed by an output signal $S_{RL}(n)$, and a voice signal outputted from the speaker 7RR at the time n is expressed by an output signal $S_{RR}(n)$.

A mixing ratio changer 20 changes the mixing ratios on the basis of the output signals $S_{FL}(n)$, $S_{FR}(n)$, $S_{RL}(n)$ and $S_{RR}(n)$ of the speakers 7FL, 7FR, 7RL and 7RR, and instructs mixers 11A and 11B to use the mixing ratios changed. The mixer 11A mixes the output signals $S_{FL}(n)$, $S_{FR}(n)$, $S_{RL}(n)$ and $S_{RR}(n)$ using the mixing ratio which is instructed to use by the mixing ratio changer 20, to generate a reference signal $r_A(n)$ for the microphone 8A. The mixer 11B similarly mixes the output signals $S_{FL}(n)$, $S_{FR}(n)$, $S_{RL}(n)$ and $S_{RR}(n)$ using the mixing ratio which is instructed to use by the mixing ratio changer 20, to generate a reference signal $r_B(n)$ for the microphone 8B.

Figure 9:
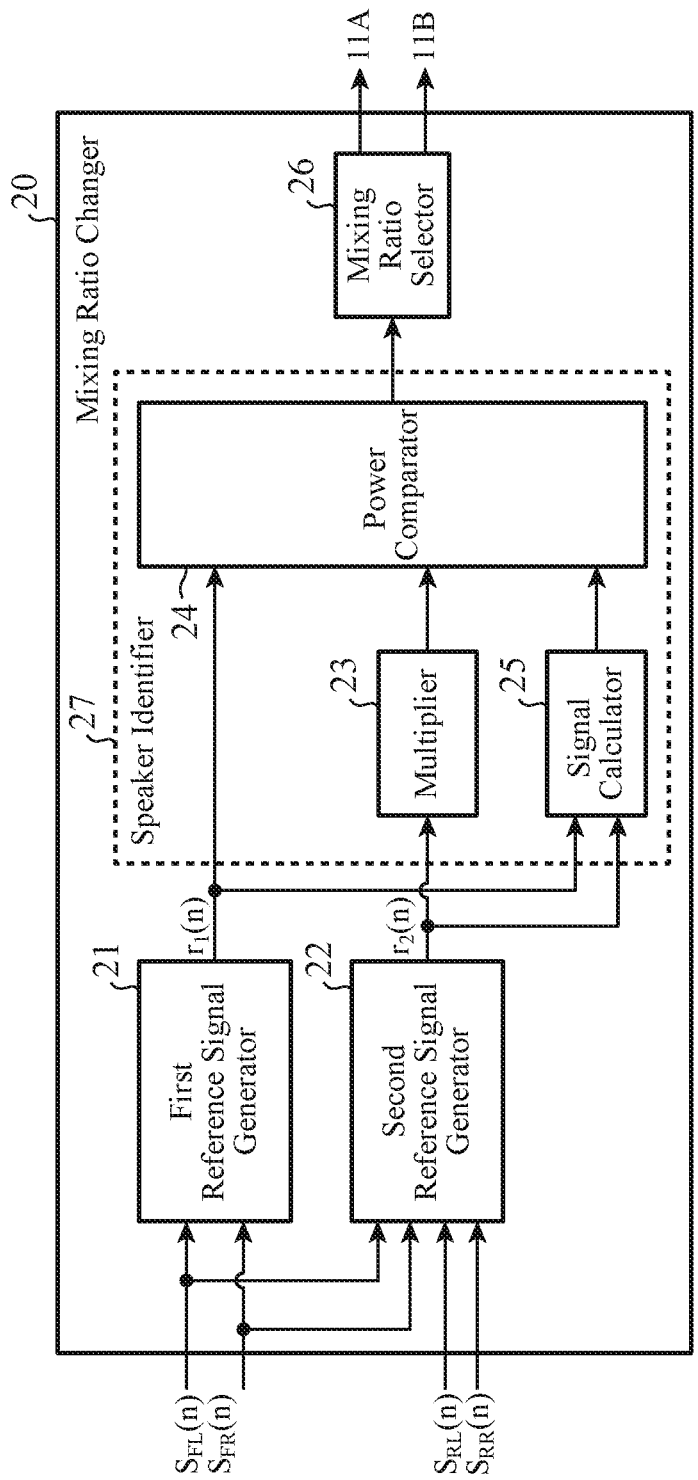
FIG. 9 is a block diagram showing an example of the internal configuration of a mixing ratio changer of the echo canceller according to Embodiment 2.

FIG. 9 is a block diagram showing an example of the internal configuration of the mixing ratio changer 20. The mixing ratio changer 20 includes a first reference signal generator 21, a second reference signal generator 22, a multiplier 23, a power comparator 24, a signal calculator 25, and a mixing ratio selector 26.

The mixing ratio of the output signals $S_{FL}(n)$ and $S_{FR}(n)=1:1$ is set to the first reference signal generator 21. The first reference signal generator 21 mixes the output signal $S_{FL}(n)$ of the speaker 7FL and the output signal $S_{FR}(n)$ of the speaker 7FR with 1:1, to generate a first reference signal $r_1(n)$ shown by the equation (1) below.

On the other hand, the mixing ratio of the output signals $S_{FL}(n)$, $S_{FR}(n)$, $S_{RL}(n)$ and $S_{RR}(n)=1:2:3:4$ is set to the second reference signal generator 22. The second reference signal generator 22 mixes the output signal $S_{FL}(n)$ of the speaker 7FL, the output signal $S_{FR}(n)$ of the speaker 7FR, the output signal $S_{RL}(n)$ of the speaker 7RL, and the output signal $S_{RR}(n)$ of the speaker 7RR with 1:2:3:4, to generate a second reference signal $r_2(n)$ shown by the following equation (2).

$$r_1(n) = 0.5 \cdot S_{FL}(n) + 0.5 \cdot S_{FR}(n) \quad (1)$$

$$r_2(n) = 0.1 \cdot S_{FL}(n) + 0.2 \cdot S_{FR}(n) + 0.3 \cdot S_{RL}(n) + 0.4 \cdot S_{RR}(n) \quad (2)$$

The multiplier 23, the power comparator 24 and the signal calculator 25 configure a speaker identifier 27. The speaker identifier 27 identifies a speaker that is outputting a voice guidance provided by the navigation device 9.

FIG. 10 is a flow chart showing a speaker identification process performed by the speaker identifier 27. The echo canceller 10 performs the process shown in the flow chart of FIG. 10 periodically.

As a precondition in performing the speaker identification process by the speaker identifier 27, it is assumed that the same sound (i.e., a reception voice of the hands-free call system 1) is being outputted from the speakers 7FL and 7FR if no voice guidance is being outputted.

To begin with, the speaker identifier 27 determines whether or not a voice guidance is being outputted from any one of the speakers 7FL, 7FR, 7RL and 7RR (in step ST11).

When it is assumed that no voice guidance is being outputted from the speakers, the following relations can be established: $S_{FL}(n)=S_{FR}(n)$ and $S_{RL}(n)=S_{RR}(n)=0$. Using these relations in combination with the simultaneous equations (1) and (2) above derives the equation (3) below. Accordingly, if the equation (3) is satisfied, it can be determined that no voice guidance is being outputted from any of the speakers.

$$r_1(n)=10/3 \cdot r_2(n) \quad (3)$$

The multiplier 23 multiplies the second reference signal $r_2(n)$ by 10/3 in accordance with the equation (3). The power comparator 24 compares the power of $r_1(n)$ generated by the first reference signal generator 21 with the power of $(10/3) \cdot r_2(n)$ calculated by the multiplier 23.

If the power of $r_1(n)$ is equal to that of $(10/3) \cdot r_2(n)$, the speaker identifier 27 determines that no voice guidance is being outputted from the speakers ("NO" in step ST11) because the above-mentioned equation (3) is satisfied. In contrast, if the power of $r_1(n)$ differs from that of $10/3 \cdot r_2(n)$, the speaker identifier 27 determines that a voice guidance is being outputted from one of the speakers ("YES" in step ST11).

If it is determined that a voice guidance is being outputted from one of the speakers ("YES" in step ST11), the speaker identifier 27 then determines whether or not the voice guidance is being outputted from the speaker 7RR (in step ST12).

Assuming that the voice guidance is being outputted from the speaker 7RR, the following relations can be established: $S_{FL}(n)=S_{FR}(n)$ and $S_{RL}(n)=0$. Using these relations in combination with the simultaneous equations (1) and (2) above derives the equation (4) below. $S_{RR}(n)$ in the equation (4) is equal to the voice guidance. Therefore, when the power of $S_{RR}(n)$ is close to zero, the speaker identifier 27 can determine that no voice guidance is being outputted from the speaker 7RR, whereas when the power of $S_{RR}(n)$ is large to some extent, the speaker identifier 27 can determine that the voice guidance is being outputted from the speaker 7RR.

$$S_{RR}(n)=-0.75 \cdot r_1(n)+2.5 \cdot r_2(n) \quad (4)$$

$$r_1(n)=10/3 \cdot r_2(n) \quad (5)$$

In Embodiment 2, the multiplier 23 multiplies the second reference signal $r_2(n)$ by 10/3 in accordance with the equation (5) which is derived from the equation (4) by assuming that no voice guidance is being outputted from the speaker 7RR, i.e., $S_{RR}(n)=0$. The power comparator 24 compares the power of $r_1(n)$ generated by the first reference signal generator 21 with that of $(10/3) \cdot r_2(n)$ calculated by the multiplier 23.

If the power of $r_1(n)$ is equal to that of $(10/3) \cdot r_2(n)$, the speaker identifier 27 determines that no voice guidance is being outputted from the speaker 7RR ("NO" in step ST12). In contrast, if the power of $r_1(n)$ differs from that of $(10/3) \cdot r_2(n)$, the speaker identifier determines that the voice guidance is being outputted from the speaker 7RR ("YES" in step ST12), and identifies the speaker 7RR as the speaker that is outputting the voice guidance (in step ST13).

If it is determined that no voice guidance is being outputted from the speaker 7RR ("NO" in step ST12), the speaker identifier 27 then determines whether or not the voice guidance is being outputted from the speaker 7RL (in step ST14).

Assuming that the voice guidance is being outputted from the speaker 7RL, the following relations can be established: $S_{FL}(n)=S_{FR}(n)$ and $S_{RR}(n)=0$. Using these relations in combination with the simultaneous equations (1) and (2) above derives the equation (6) below. In accordance with the equation (6), if the power of $S_{RL}(n)$ is close to zero, the speaker identifier 27 can determine that no voice guidance is being outputted from the speaker 7RL, whereas if the power of $S_{RL}(n)$ is large to some extent, the speaker identifier can determine that the voice guidance is being outputted from the speaker 7RL.

$$S_{RL}(n)=(n)+3/10 \cdot r_2(n) \quad (6)$$

$$r_1(n)=3/10 \cdot r_2(n) \quad (7)$$

In Embodiment 2, the multiplier 23 multiplies the second reference signal $r_2(n)$ by 3/10 in accordance with the equation (7) which is derived from the equation (6) by assuming that no voice guidance is outputted from the speaker 7RL, i.e., $S_{RL}(n)=0$. The power comparator 24 compares the power of $r_1(n)$ generated by the first reference signal generator 21 with that of $(3/10) \cdot r_2(n)$ calculated by the multiplier 23.

If the power of $r_1(n)$ is equal to that of $(3/10) \cdot r_2(n)$, the speaker identifier 27 determines that no voice guidance is being outputted from the speaker 7RL ("NO" in step ST14). In contrast, if the power of $r_1(n)$ differs from that of $(3/10) \cdot r_2(n)$, the speaker identifier determines that the voice guidance is being outputted from the speaker 7RL ("YES" in step ST14), and identifies the speaker 7RL as the speaker that is outputting the voice guidance (in step ST15).

If it is determined that no voice guidance is being outputted from the speaker 7RL ("NO" in step ST14), the speaker identifier 27 then determines from which one of the speakers 7FL and 7FR the voice guidance is being outputted (in steps ST16 and ST17).

Because the voice guidance is outputted from neither of the speakers 7RR and 7RL, the following relations can be established: $S_{RR}(n)=S_{RR}(n)=0$. Using these relations with the simultaneous equations (1) and (2) above derives the following equations (8) and (9).

$$S_{FL}(n)=4 \cdot r_1(n)-10 \cdot r_2(n) \quad (8)$$

$$S_{FR}(n)=-2 \cdot r_1(n)+10 \cdot r_2(n) \quad (9)$$

The signal calculator 25 calculates $S_{FL}(n)$ using the first reference signal $r_1(n)$ and the second reference signal $r_2(n)$ which are inputted thereto, according to the equation (8), and also calculates $S_{FR}(n)$ according to the equation (9) (in step ST16). The power comparator 24 compares the power of $S_{FL}(n)$ with that of $S_{FR}(n)$ on the basis of $S_{FL}(n)$ and $S_{FR}(n)$ calculated by the signal calculator 25 (in step ST17).

The speaker identifier 27 determines that the voice guidance is outputted from the speaker which provides the signal having larger power. More specifically, if the power of $S_{FR}(n)$ is larger than that of $S_{FL}(n)$ ("YES" in step ST17), the speaker identifier 27 determines that the voice guidance is being outputted from the speaker 7FR (in step ST18), whereas if the power of $S_{FL}(n)$ is larger than that of $S_{FR}(n)$ ("NO" in step ST17), the speaker identifier determines that the voice guidance is being outputted from the speaker 7FL (in step ST19).

The speaker identifier 27 notifies the mixing ratio selector 26 of a voice guidance output speaker identified.

The mixing ratio selector 26 holds setting information showing a correspondence between voice guidance output speaker and mixing ratios set in advance. The mixing ratio selector 26 selects mixing ratios corresponding to a speaker notified by the speaker identifier 27 from the setting information, and instructs the mixers 11A and 11B to use the mixing ratios.

Hereafter, an example of the setting information will be explained.

For example, in a case in which no voice guidance is outputted from any of the speakers, a mixing ratio of the output signals $S_{FL}(n)$, $S_{FR}(n)$, $S_{RL}(n)$ and $S_{RR}(n)$ may be set to 1:1:0:0 for both the mixers 11A and 11B because the reception voice of the hands-free call system 1 is outputted symmetrically from the speakers 7FL and 7FR.

Further, for example, in a case in which the voice guidance output speaker is the speaker 7RR, the mixing ratio for the mixer 11A may be set to 4:4:0:2, and the mixing ratio for the mixer 11B may be set to 4:4:0:1.

Further, for example, in a case in which the voice guidance output speaker is the speaker 7RL, the mixing ratio for the mixer 11A may be set to 4:4:1:0, and the mixing ratio for the mixer 11B may be set to 4:4:2:0.

Further, for example, in a case in which the voice guidance output speaker is the speaker 7FR, the mixing ratio for the mixer 11A may be set to 3:7:0:0, and the mixing ratio for the mixer 11B may be set to 7:3:0:0.

Further, for example, in a case in which the voice guidance output speaker is the speaker 7FL, the mixing ratio for the mixer 11A is set to 7:3:0:0, and the mixing ratio for the mixer 11B may be set to 3:7:0:0.

Further, identifying a speaker outputting a voice guidance by the speaker identifier 27 allows separation of the voice guidance provided by the navigation device 9 from the reception voice of the hands-free call system 1. For example, if the relation $S_{FL}(n)<SFR(n)$ is satisfied in step ST17 of FIG. 10, the output signal $S_{FR}(n)$ of the speaker 7FR includes both the voice guidance and the reception voice of the hands-free call system 1, while the output signal $S_{FL}(n)$ of the speaker 7FL includes the reception voice of the hands-free call system 1. Therefore, by subtracting the output signal $S_{FL}(n)$ from the output signal $S_{FR}(n)$, the voice guidance can be separated from the reception voice. The mixers 11A and 11B may mix the separated voice guidance and reception voice of the handsfree call system 1 with different ratios, to generate reference signals.

Further, a method of deleting echoes efficiently by using two adaptive filters may be used. One of the adaptive filters uses the separated voice guidance as a reference signal to delete echoes. The other adaptive filter uses the separated reception voice as a reference signal to delete echoes. By this, the adaptive filters can delete the echo stably without performing any incorrect operation.

Although in the above-mentioned explanation the voice guidance provided by the navigation device 9 is shown as an example of a signal that is temporarily outputted from a speaker and superimposed, this embodiment is not limited to this example. For example, a warning sound produced while the vehicle 3 is traveling backward or the like may be superimposed.

As described above, the mixing ratio changer 20 according to Embodiment 2 is configured so as to hold the setting information showing a correspondence between speaker outputting a superimposed signal and mixing ratios for instructing the mixers 11A and 11B to use, identify a speaker that is outputting the superimposed signal using a plurality of reference signals which are generated with different mixing ratios, select mixing ratios corresponding to the identified speaker from the setting information, and instruct the mixers 11A and 11B to use the selected mixing ratios. Therefore, even in a situation in which the power ratio of the plurality of speakers changes dynamically, echoes can be removed with a high degree of accuracy.

Above-described Embodiments 1 and 2 may be combined. In this case, in the echo canceller 10 shown in FIG. 8, the residual echo detectors 14A and 14B and the mixing ratio changer 15 shown in FIG. 1 are added. As a result, the mixing ratios of the mixers 11A and 11B can be changed by the mixing ratio changer 20 in accordance with the position of the voice guidance output speaker, and then the changed mixing ratios can be further optimized by the mixing ratio changer 15. Therefore, the removal performance of the echo is improved.

Although in above-described Embodiments 1 and 2 the example of applying the echo canceller 10 to the hands-free call system 1 installed in the vehicle 3 is shown, application is not limited to this example. For example, the echo canceller 10 may be applied to a video conferencing system for hands-free call.

Further, embodiments may be combined, or any elements of the embodiments may be modified or omitted within the scope of the invention.

INDUSTRIAL APPLICABILITY

Because the echo canceller according to the present invention changes the mixing ratios used at the time of generating reference signals in accordance with a dynamic change of the power ratio of a plurality of speakers, the echo canceller is suitable for use as, for example, an echo canceller for a hands-free call system used in a vehicle in which a voice guidance provided by a navigation device or the like exists.

REFERENCE SIGNS LIST 1 hands-free call system; 2, 4 mobile phone; 3 vehicle; 5 communication device; 6 amplifier; 7FL, 7FR, 7RL, 7RR speaker; 8A, 8B microphone; 9 navigation device; 10 echo canceller; 11A, 11B mixer; 12 adaptive filter; 13A, 13B subtractor; 14A, 14B residual echo detector; 15, 20 mixing ratio changer; 21 first reference signal generator; 22 second reference signal generator; 23 multiplier; 24 power comparator; 25 signal calculator; 26 mixing ratio selector; and 27 speaker identifier.

The invention claimed is:

1. An echo canceller for removing echoes from N (N≥2) input signals inputted through N microphones that receive a plurality of output signals outputted by a plurality of speakers, wherein a superimposition signal is superimposed temporarily onto at least one of the plurality of output signals, the echo canceller comprising:

N mixers to generate N reference signals, each mixer to mix the plurality of output signals outputted by the plurality of speakers with a mixing ratio instructed to use;

an adaptive filter to generate N pseudo echo signals from the N reference signals generated by the N mixers;

N subtractors to subtract the N pseudo echo signals from the N input signals, and to generate N echo eliminated signals; and a mixing ratio changer to instruct the N mixers to change the mixing ratio on a basis of an amount of echo contained in each of the N input signals.

2. The echo canceller according to claim 1, the echo canceller further comprising: N residual echo detectors to detect N amounts of residual echo from the N echo eliminated signals, wherein the mixing ratio changer changes the mixing ratio used by each of the N mixers until all of the N amounts of residual echo detected by the N residual echo detectors become equal to or smaller than a threshold.

3. The echo canceller according to claim 1, wherein the mixing ratio changer holds setting information showing a correspondence between speaker that outputs superimposition signal and mixing ratios to be instructed for the N mixers to use, identifies a speaker that outputs the superimposition signal using a plurality of reference signals with a differing mixing ratio, selects mixing ratios corresponding to the identified speaker with reference to the setting information, and instructs the N mixers to use the selected mixing ratios.

4. The echo canceller according to claim 3, the mixing ratio changer comprising:

a first reference signal generator to mix the plurality of output signals to be outputted by the plurality of speakers with a preset first mixing ratio, and to generate a first reference signal;

a second reference signal generator to mix the plurality of output signals to be outputted by the plurality of speakers with a preset second mixing ratio, and to generate a second reference signal; and a speaker identifier to calculate an output signal for each speaker on an assumption that the superimposition signal is superimposed on any one of the speakers by using the first and second reference signals, and to identify the speaker that outputs the superimposition signal on a basis of the calculated output signal.

5. The echo canceller according to claim 1, wherein the output signals are signals of a reception voice received by a hands-free call system mounted in a vehicle, and the superimposition signal is either a signal of voice guidance outputted by a navigation device mounted in the vehicle or a signal of warning sound provided when the vehicle travels backward.

* * * * *